(12) United States Patent
Haselberger et al.

(10) Patent No.: US 9,524,146 B2
(45) Date of Patent: Dec. 20, 2016

(54) TYPED ACCESS OF BUSINESS OBJECT DATA STRUCTURES

(71) Applicants: Johannes Haselberger, Walldorf (DE); Tilman Bohnengel, Schoenau (DE); Hardy Kiefer, Gernsheim/Rhein (DE)

(72) Inventors: Johannes Haselberger, Walldorf (DE); Tilman Bohnengel, Schoenau (DE); Hardy Kiefer, Gernsheim/Rhein (DE)

(73) Assignee: SAP SE, Walldorf (DE)

( * ) Notice: Subject to any disclaimer, the term of this patent is extended or adjusted under 35 U.S.C. 154(b) by 645 days.

(21) Appl. No.: 13/715,562

(22) Filed: Dec. 14, 2012

(65) Prior Publication Data
US 2014/0173632 A1 Jun. 19, 2014

(51) Int. Cl.
*G06F 9/46* (2006.01)
*G06F 9/44* (2006.01)

(52) U.S. Cl.
CPC ................................ *G06F 8/24* (2013.01)

(58) Field of Classification Search
None
See application file for complete search history.

(56) References Cited

U.S. PATENT DOCUMENTS

| | | | |
|---|---|---|---|
| 2004/0015839 A1* | 1/2004 | Sarkar et al. | 717/108 |
| 2007/0156428 A1* | 7/2007 | Brecht-Tillinger et al. | 705/1 |
| 2011/0023009 A1* | 1/2011 | Brunswig et al. | 717/104 |
| 2012/0110547 A1* | 5/2012 | Wendel et al. | 717/108 |

* cited by examiner

*Primary Examiner* — Umut Onat

(57) ABSTRACT

A service request is received to execute an operation on a business object. Thereafter, the business object is associated with one of a plurality of business object access classes that in turn comprise methods, types, and constants to execute the operation on the business object. The business object is then called using the associated business object access class to respond to the service request. Related apparatus, systems, techniques and articles are also described.

18 Claims, 3 Drawing Sheets

TYPED ACCESS OF BUSINESS OBJECT DATA STRUCTURES

TECHNICAL FIELD

The subject matter described herein relates to typed accesses of business object data structures using a business object access class.

BACKGROUND

Business object data structures (sometimes referred to simply as business objects) can be characterized as meta-objects that in turn describe a business entity (such as a sales order or a business partner), its sub-entities or business object nodes (such as a sales order item), a relationship among business objects and/or business object nodes, or operations (actions, queries) provided by the business entity. Business objects are advantageous in that they allow model driven development of business applications. With a model driven approach, a meta-object model contains all information required to generate a database model without further actions from the developer.

Many platforms utilize a generic interface for accessing business objects that is applicable for all business objects within a generic, central framework. With such platforms, when accessing a business object or when triggering one of its actions, a generic interface must be called that specifies the correct business object types and names. The correct business object types and names can be generated using a business object specific, generated interface that is specific to the business object (i.e., that includes the suitable types and constants).

As will be appreciated, the usage of a generic interface for all business objects always requires a compromise. With such scenarios, it is impossible to consider the special situation of each business object, for example the cardinality of actions and associations (i.e., whether the parameter of the specific business object a table or a structure, etc.). In addition, a generic interface hinders the usage of some features of the business object. For example, inline-definitions for output parameters are not possible with generic interfaces due to the generic typing of interface parameters. In addition, a generic interface hinders the usage of editor features like code-completion or static syntax checks due to the generic interface parameters. This limitation increases the likelihood of programming errors.

Furthermore, generic business object interfaces can only be used with accesses originating outside the relevant business object. Inside the implementation of the business object itself, other interfaces typically need to be used which are different than the outward facing generic interfaces.

SUMMARY

In one aspect, a service request is received to execute an operation on a business object. Thereafter, the business object is associated with one of a plurality of business object access classes that in turn comprise methods, types, and constants to execute the operation on the business object. The business object is then called using the associated business object access class to respond to the service request.

The business object access class can be generated automatically during activation of the business object. The service request can originate external to the business object. For example, the service request can originate from an application programming layer that is received by an enterprise services framework. The service request can additionally or alternatively originate internal to the business object.

The operation can be an access operation. The business object can include a plurality of nodes and a global business object class can apply to all of the plurality of nodes. There can be a local business object access class for each node with the local business object access class being used to execute an operation for the corresponding node. The global business object access class can specify each of the local business object classes for the business object. The business object access class can call a generic interface of the business object. Such a generic interface can be characterized as generic in that it is used by each of a plurality of different business objects for access.

Computer program products are also described that comprise non-transitory computer readable media storing instructions, which when executed by one or more data processors of one or more computing systems, cause the at least one data processor to perform operations herein. Similarly, computer systems are also described that may include one or more data processors and a memory coupled to the one or more data processors. The memory may temporarily or permanently store instructions that cause the at least one processor to perform one or more of the operations described herein. In addition, methods can be implemented by one or more data processors either within a single computing system or distributed among two or more computing systems.

The subject matter described herein provides many advantages. For example, the current subject matter is advantageous in that it provides a single interface for calls both external and internal to a business object. In addition, the current subject matter obviates certain disadvantages of generic business object interface by allowing inline-definition of parameters, code completion, and static syntax checks.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
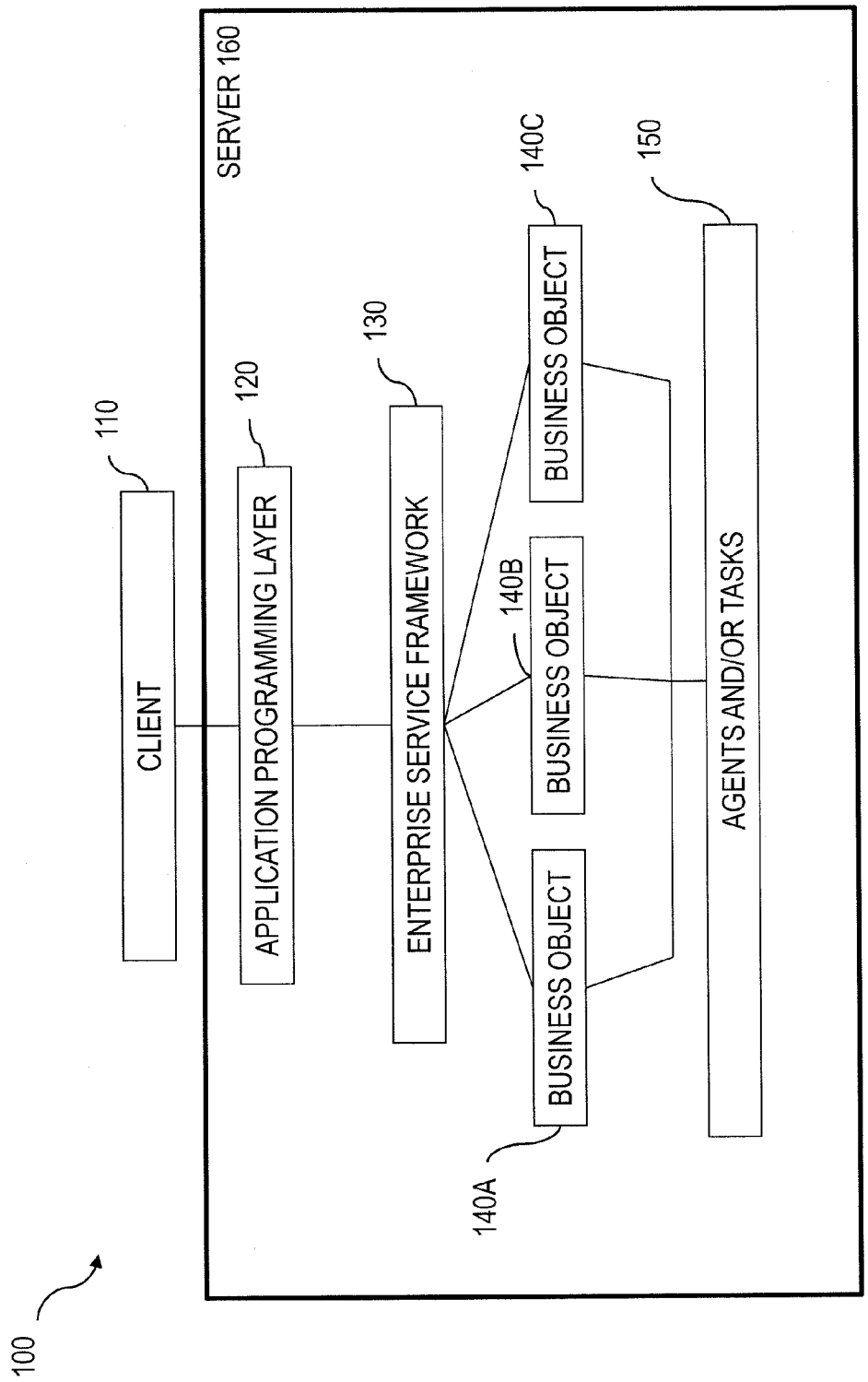
FIG. 1 is a diagram illustrating an architecture comprising an enterprise services framework providing typed business object access, according to at least one implementation.

FIG. 1 illustrates a system 100 for processing of data structures, such as business object data structures (also referred to herein as "business objects" or "business object instances"). The system 100 can process and store business object data (e.g., the data fields of a business object). Examples of processing can include: determining consistency of data of a data object, such as a business object including data; performing saving procedures to store data within a database and/or a repository; performing updates to data that can be in a business object (e.g., updates due to newly created, entered, and/or saved data); and performing any other tasks that can manipulate, maintain and/or store data in the data objects. The system 100 can be used to process various business objects (e.g., data structured according to a task, such as sales orders, purchase orders, etc.).

A client application 110 can be used to enter, modify, update, etc. various data that can be processed and eventually passed to a business object 140 for storage, retrieval, etc. The client application 110 can interact with an application processing layer 120 (such as those encoded in the Advanced Business Application Programming (ABAP) language) for the purposes of processing the data, such as, for example, creating sales orders, writing and editing reports and module pools, processing database table definitions, designing user interfaces, designing screens and flow logic, building function modules, etc.

The server 160 can be implemented as at least one processor and at least one memory and can include the application processing layer 120, an enterprise services framework 130, business objects 140, and agents 150.

The application processing layer 120 can interact with a framework (e.g., an enterprise service framework ("ESF") 130). An example of an ESF is commercially available from SAP AG, Walldorf, Germany. The term "framework" can refer to a system of interrelated components, such as programs and the like, providing a business system for performing business functions. The ESF 130 can be configured to interact with at least one business object 140. The ESF 130 can abstract the business objects 140, which can be modeled as services (also referred to as enterprise services) providing, for example, purchase order generation, sales order generation, and the like. Aggregating services into business-level enterprise services can provide more meaningful building blocks for the task of automating enterprise-scale business scenarios.

The ESF 130 can include a persistence repository for storing relevant pre-existing enterprise services, which can be made available to selected users. By using a repository, the selected users can use the pre-existing enterprise services to aid in the implementation of new services and corresponding business objects 140. As noted, the business object can represent an object, such as a data structure including data and operations, of significance to a business. Examples of business objects can include a purchase order, a sales order, a flight reservation, a shipping order, customer information, employee information, and the like. An enterprise service can thus provide an interface to enable other services and applications to access and process (e.g., create, fill-in, save, query, delete, print, send, and the like) the business object 140.

Business objects 140 and data related to business objects can be stored in a storage mechanism, such as a database or any other persistent storage repository. The system 100 can include an agent 150, which can be initiated upon receipt of data related to the business objects 140. For example, agent 150 can be used to perform various tasks, such as update information related to business objects stored in the database, further process the data, determine the order of storing the data, perform various database update tasks, etc. In some implementations, agents can serve as a bridge or a proxy for tasks, which can be executed after an initial task has been completed. In this case, agents can collect data and transform it in such a way so that the tasks can be processed later on by other components in the system 100. Agents can be configured to generate a message as output. The message may be provided to components in the system 100. Examples of agents may include at least one of the following: an output management agent, a task agent, an application agent, a business information agent, a business-to-business messages agent, and others. The output management agent can collect data for generating a form, which can be sent to a printer or via an email to a recipient. The task agent can collect information that may be needed to process a task and send the information to a recipient (e.g., for approval). The application can collect data that can be needed for a process in another application area. The business information agent can collect data for notification of a business information warehouse. The business-to-business messages agent can collect data that can be used to send information to an external business partner (e.g., information can be sent from a buyer to a supplier). To ensure global data consistency, the agents 150 can collect data during a current session of the system 100.

The ESF 130 can generate a message indicating that the data that the client 110 entered has been successfully saved in the system 100. In addition, the ESF 130 can generate a message indicating that the data that the client 110 entered was not saved and/or that such data is locked. Such messages can be presented to the client 110 via a user interface in the form of a message, such as a Hypertext Markup Language ("HTML") message. For example, in some implementations, if a sales order object is being created and saved by the client 110, the HTML message indicating successful storage of the data can also include a sales order number which can confirm that a particular sales order has been created and saved to the system 100. In some implementations, the message generated by the ESF 130 can be presented by automatically updating of the client's user interface, or by sending an email, an instant message, a text message, a multimedia message, etc. to the client 110, or in any other form. In order to save the business object data to the system 100, the system 100 can be configured to perform a save-and-exit procedure.

The ESF 130 can provide a helper class for interacting with the business objects 140. The helper class can contain data field descriptions such as field types and names that are associated, by the ESF 130, with state variables at program run time. Such state variables can either belong to the helper class or specific instances of the helper class. These types of helper classes are referred to herein as business object access classes. As will be described in further detail below, there can be various types of business object access classes including, for example, global business object access classes that pertain to all nodes of a particular business object 140 and local business object access classes that pertain to a particular node of a business object 140. In addition, the business object access classes can be generated automatically during activation of the corresponding business object 140.

The application programming layer 120 via, for example ABAP code, accesses the business object accesses classes via an interface that provides structure and behavior. Structure in this regard consists of data and state, and behavior consists of code that specifies how methods are implemented. In particular, business object access classes can have a local business object access class for every node of a business object in addition to a global business object access class that applies to all nodes. The global business object access class can offer a static member that uses a node name referring to a specific local business object access class. Every local (node) business object access class can, in turn, have a set of methods dependent on the definition of the corresponding business object. In addition to service requests originating from the application programming layer 120, the business object access classes can also be used for calls internal to the corresponding business object which is not permitted by generic interfaces.

As will be described in further detail below, the business object access classes are advantageous in that they provide strongly typed methods for accessing business object data (e.g., RETRIEVE, RETRIEVE_BY_ASSOCIATION), strongly typed methods for all the actions and associations of a business object, strongly typed service methods for business object handling (e.g., CONVERT_KEY), and constants and types for the data declarations (and for the usage of the generic interface in the context of generic frameworks etc.). The business object access classes comprise implementations of specific methods that can use the constants and types of the class to route the service requests to the generic interface (or a suitable successor) for the corresponding business object 140. In addition to access using the business object accesses classes, the business objects 140 can be accessed directly via their respective generic interfaces.

With the use of business object access classes that have node-specific typed methods, fewer constants may be required as compared to generic interfaces. For example, constants for node names, action names or association names can be provided in the context of a method call. Constants that can be generated and required for typed business object access (via a business object access class) include, for example: Node Element Names, Action Parameter Element Names, Association Filter Element Names, and Dependent Object Usage Prefix.

A constants definition of a root node can be as follows:

| Typed BO Access Constants |
|---|
| ```
CLASS root DEFINITION FINAL
CREATE PRIVATE.
  PUBLIC SECTION.
    CONSTANTS: BEGIN OF co_attr.
      flag                   TYPE string VALUE 'FLAG',
      BEGIN OF quantity,
        content              TYPE string VALUE 'QUANTITY-
                                            CONTENT',
        unit_code            TYPE string VALUE
                                            'QUANTITY-UNIT_CODE',
      END OF quantity,
      value                  TYPE string VALUE 'VALUE',
    END OF co_attr.
...
ENDCLASS.
``` |

All business object specific types that may be required for a typed business object 140 can be generated directly into the business object access class. As such, no additional interface is required within the implementation (because the business object access class can call the corresponding generic interface of the business object 140).

Business access type definitions can be as follows:

| Typed BO Access Type Definitions |
|---|
| ```
TYPES: ti_item TYPE esf_v_hf_modify_item_el.
TYPES: BEGIN OF ty_item,
         node_in TYPE sesf_node id,
         parent_node_to TYPE sesf_node_id.
         INCLUDE TYPE ti_item AS node elements.
TYPES: END OF ty_item.
TYPES: tt_item          TYPE STANDARD TABLE OF ty_item WITH EMPTY KEY
                        WITH NON-UNIQUE SORTED KEY node_id
COMPONENTS node_id
                        WITH NON-UNIQUE SORTED KEY parent_node_id
COMPONENTS parent_node_id.
...
CLASS item DEFINITION FINAL CREATE PRIVATE.
  PUBLIC SECTION.
    TYPES: ty_node       TYPE ty_item,
           tt_node       TYPE tt_item.
    ...
ENDCLASS.
``` |

Each business object 140 can also provide various core services such as a create operation. Every node that is not final create disabled (i.e., the create operation is not disabled) can get a create method. A table with node instances can specify which nodes are to be created. If the creation of at least one entry fails (e.g. due to alternative key collisions, etc.), the complete create request can be rejected. This failure can be indicated by returning a parameter.

A create service can be as follows:

| Create Service |
|---|
| ```
CLASS-METHODS create
  IMPORTING
    it_data           TYPE tt_node
  EXPORTING
    et_message        TYPE if_esf_types=>ty_messages
  RETURNING
    VALUE(rv_failed)  TYPE abap_bool.
``` |

If the creation shall be done by the help of an implemented association (e.g., if one does not create a node instance by adding it directly below its parent/superior node, but by a cross jump from a node to another one which is not directly below—this can only work if the relation between the nodes is implemented, so that the implementation can find the suitable parent node for the target node), the following generated methods can be used (further information is provided below with regard to association navigation service):

| Create (via implemented association) |
|---|
| ```
CLASS-METHODS cb_<name of the association>
  IMPORTING
    iv_source_node_id     TYPE sesf_node_id
    it_data               TYPE tt_<target_node>
``` |

| Create (via implemented association) | |
|---|---|
| EXPORTING | |
| et_message | TYPE if_esf_types=>ty_messages |
| RETURNING | |
| VALUE(rv_failed) | TYPE abap_bool. |

| Update Service |  |
|---|---|
| RETURNING | |
| VALUE(rv_failed) | TYPE abap_bool. |

| Update Service Example |
|---|
| " complete update |
| bo_sales_order=>root=>update( lt_root ). |
| " update on a set of node elements |
| bo_sales_order=>root=>update( |
|     EXPORTING |
|       it_data            = VALUE #( ( node_id = lv_node_id quantity-content = 42 ) ) |
|       it_changed_element    = VALUE #( ( bo_sales_order=>root=>co_attr-quantity-content ) ) ). |

Another core service of the business objects 140 is an update service. Every node that is not final update disabled (i.e., the update operation is not disabled) can get an update method. A table with node instances can be used to update the business object. If at least one update fails (e.g. due to a lock collision, etc.) the complete update is rejected, which can be indicated by a returning parameter. Optionally, a list of changed elements can be provided, which is applied for all node instances to be updated. If at least one node element is provided only the listed node elements can be taken over changed (i.e., the other elements of the structure can be ignored). If no changed elements are provided all node elements can be taken over. That holds also true for empty node elements.

In general two patterns to use this method exist, namely (i) retrieve/manipulate/update and (ii) build table/update. For the first pattern of use, the data of a node can be first read using a retrieve call. Secondly, the read data table can be changed directly as desired. Next, this table can be handed back to the ESF 130 by calling an update with that table. In this case, it is not necessary to provide changed elements because the table is already completely filled. This approach can be used if the data itself is required for the processing itself (e.g., a value of a node element is dependent another node element on the same node instance). For the second pattern of use, a table of node instances can be first created from scratch and filling only node elements that should be updated. Subsequently, the table can be passed to the ESF 130 by using the update. With this latter approach, the changed elements need to be specified otherwise all node elements not set are cleared.

An update service and an update service example can be as follows:

| Update Service |  |
|---|---|
| CLASS-METHODS update | |
|   IMPORTING | |
|     it_data | TYPE tt_node |
|     it_changed_element | TYPE sesf_string_tab OPTIONAL |
|   EXPORTING | |
|     et_message | TYPE if_esf_types=>ty_messages |

| Update Service |  |
|---|---|
| RETURNING | |
|   VALUE(rv_failed) | TYPE abap_bool. |

A further core service is a delete service. Every node that is not final delete disabled (i.e., the delete operation is not disabled) can have a delete method. A list of node instances that should be deleted can be passed by using their node identifiers (NODE_IDs, etc.). If the deletion of at least one node instance fails, the complete delete call can be rejected which is indicated by the returning parameter. Node instances that are below the node instances specified in the delete service can be deleted. If such a node instance cannot be deleted, the delete call can be rejected.

A delete service and a delete service example can be as follows:

| Delete Service |  |
|---|---|
| CLASS-METHODS delete | |
|   IMPORTING | |
|     it_node_id | TYPE sesf_node_id_tab |
|   EXPORTING | |
|     et_message | TYPE if_esf_types=>ty_messages |
|   RETURNING | |
|     VALUE(rv_failed) | TYPE abap_bool. |

| Delete Service Example |
|---|
| bo_sales_order=>root=>delete( VALUE # |
| ( ( lv_sales_order_root_node_id ) ) ). |

A further core service is a retrieve service. Every node can get a retrieve method to read a set of node instances of a single node type. The requested instances can be specified by providing their node identifiers (NODE_IDs) and the data can be returned (e.g., in RT_DATA) for all node instances that have been found. An edit mode attribute can be used to determine which lock mode should be set for the requested node instances (when there are multiple users for a particular node instance). A requested image attribute can be used to determine the data image which is used to read the data. Defaults can be set to support the most common case to read without locks on the corresponding transactional buffer.

A retrieve service and a retrieve service example can be as follows:

Retrieve Services

```
CLASS-METHODS retrieve
   IMPORTING
      it_node_id            TYPE sesf_node_id_tab
      iv_edit_node          TYPE if_esf_types=>ty_edit_node   DEFAULT if_esf_types=>co_read_only
      iv_requested_image    TYPE if_esf_types=>ty_image       DEFAULT
if_esf_types=>op_image_transactional_buffer
   EXPORTING
      et_message            TYPE if_esf_types=>ty_messages
   RETURNING
      VALUE(rt_data)        TYPE tt_node.
```

Retrieve Service Example

```
DATA(lt_root) = bo_sales_order=>root=>retrieve( it_node_id ).
```

In some cases, a retrieve operation may not only want to retrieve the instances of a single node, but also all instances of a substructure of a node. In such cases, a core service retrieve substructure can be used. All instances of all nodes which are below the node specified by the retrieve substructure service can be retrieved via compositions and returned in a nested table result structure.

A sample retrieve substructure service is as follows:

Retrieve_Substructure Service

```
CLASS-METHODS retrieve_substructure
   IMPORTING
      it_node_id     TYPE sesf_node_id_tab
      iv_edit_node   TYPE if_esf_types=>ty_edit_node DEFAULT if_esf_types=>co_read_only
   RETURNING
      VALUE(rt_data) TYPE ty_deep_table.
```

In some cases, the whole composition tree of a node may need to be modified. In such cases a modify substructure service can be used. With such cases, the whole composition tree must be provided for the entry node. In addition, existing node instances can be updated in case node elements have been changed, non-existing node instances can be created, and missing node instances can be deleted.

One example of a modify substructure service is as follows:

Modify_Substructure Service

```
CLASS-METHODS modify_substructure
   IMPORTING
      it_data          TYPE ty_deep_table
   EXPORTING
      et_message       TYPE if_esf_types=>ty_messages
   RETURNING
      VALUE(rv_failed) TYPE abap_bool.
```

A further core service is an association navigation service. With such a service, every node can have a set of methods that can be used to navigate to other nodes—one method for every outgoing association. If the association does not start with a pre-defined prefix (such as 'TO_'), this prefix can be used to assemble a method name (e.g., TO_ITEM for an association with name ITEM, TO_ROOT for an association with name TO_ROOT, etc.). Similar to a retrieve service, an edit mode attribute can determine which lock mode should be set for the requested node instances (when there are multiple users for a particular node instance). A requested image attribute can be used to determine the data image that is used to read the data. A target node identification attribute can be used to characterize a list of node identifiers (e.g., NODE_IDs) of the target node found by the navigation. Additional link attributes can be included that provide a list of links among source and target nodes.

A sample association navigation service and association navigation service example can be as follows:

Association Navigation Service

```
CLASS-METHODS to_item
   IMPORTING
      it_node_id            TYPE sesf_node_id_tab
      iv_edit_node          TYPE if_esf_types=>ty_edit_node   DEFAULT if_esf_types=>co_read_only
      iv_requested_image    TYPE if_esf_types=>ty_image       DEFAULT
if_esf_types=>co_image_transactional_buffer
```

| Association Navigation Service | |
|---|---|
| EXPORTING | |
|    et_target_node_id | TYPE sesf_node_id_tab |
|    et_link | TYPE sesf_node_id_link_tab |
|    et_message | TYPE if_esf_types=>ty_messages |
| RETURNING | |
|    rt_data | TYPE tt_item. |

| Association Navigation Service Example |
|---|
| DATA(lt_item) = bo_sales_order=>root=>to_item( lt_root_node_id ). |

Another core service is an alternative key service. With such a service, every node can get a set of methods that can be used to convert alternative key values to node identifiers (e.g., NODE_IDs). For this conversion a method can be generated per alternative key using a pre-defined prefix (e.g., "CONV_") and the name of the alternative key. A list of node identifiers (e.g., NODE_IDs) can be returned that specify the node instances that have the given alternative key values. If an alternative key value cannot be found in the image specified by the service, the values that are not found can be returned.

An example of an alternative key service can be as follows:

| Alternative Key Service | | |
|---|---|---|
| " example for alternative key names VALUE | | |
| CLASS-METHODS conv_value | | |
|   IMPORTING | | |
|     it_key | TYPE tt_key-value | |
|     iv_requested_image | TYPE if_esf_types=>ty_image | DEFAULT |
| if_esf_types=>co_image_transactional_buffer | | |
|   EXPORTING | | |
|     et_failed_key | TYPE tt_key-value | |
|     et_data | TYPE tt_node | |
|   RETURNING | | |
|     VALUE (rt_node_id) | TYPE sesf_node_id_tab. | |

An execute action core service can be provided in which each node has a set of methods to execute the corresponding actions. Some of the parameters can be dependent from the action settings. That is, some actions such as "delete everything" do not need any input while other actions have specific parameters to control the way the action is performed. One example of the latter is an action: "create a copy for user ABC" which necessarily needs the name of the user ABC.

Every dependent object (i.e., business object node other than the root node) can have its own business object access class. With such an arrangement, there is no need to generate host business object specific typed API. Instead, all accesses to the dependent object can use the typed access of the dependent object directly. The ESF 130 can ensure that the call is routed correctly depending on the context of the caller. Context (i.e., additional data) can be provided so that every method of the typed access class of a dependent object has two additional parameters to give the context of the dependent object usage. For example, one parameter can specify a header object (i.e., the parent node) of the dependent object (i.e., the child node). The other parameter can specify how the dependent object is used in the parent header object.

Figure 2:
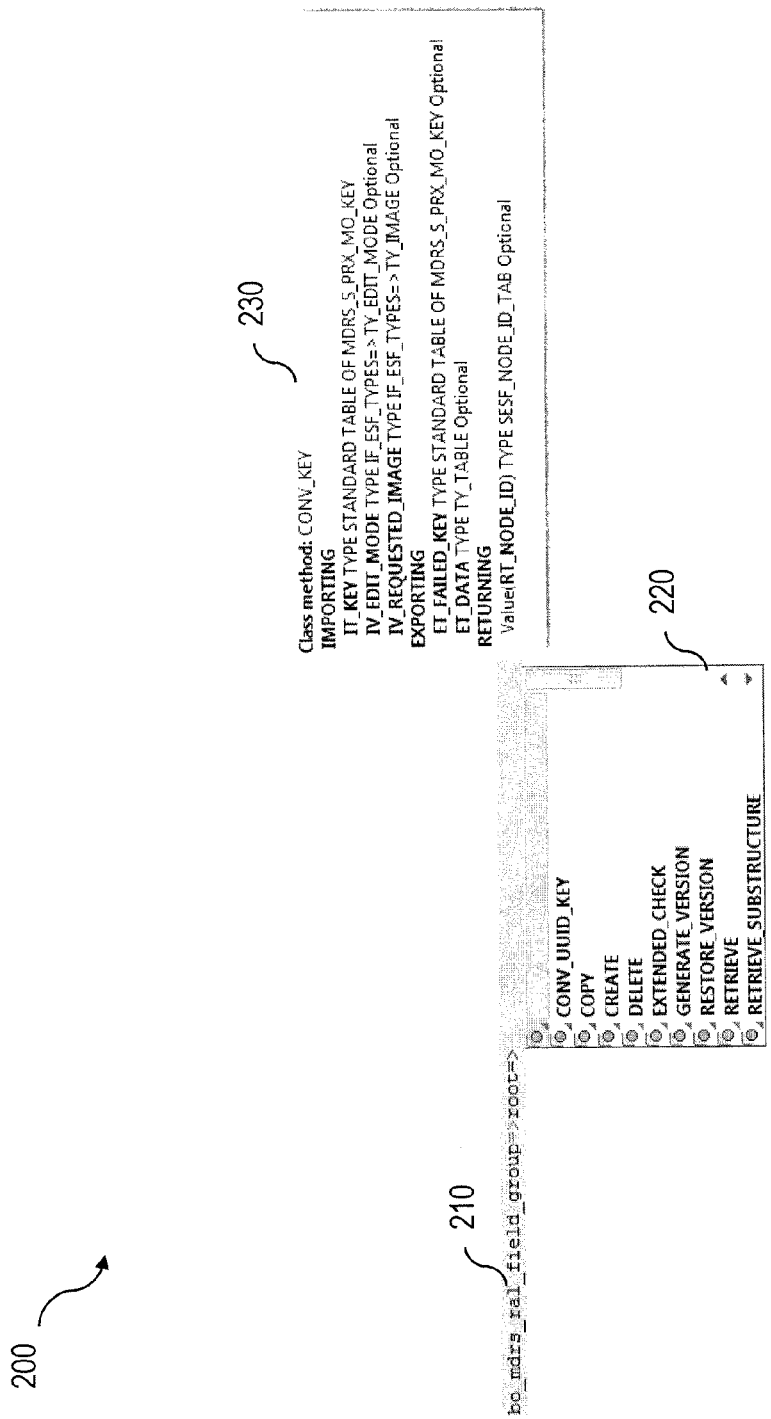
FIG. 2 is a diagram illustrating an interface providing code completing for selecting methods available for a particular access class.

FIG. 2 is a diagram 200 of an interface illustrating one aspect of the current subject matter in which code completion is offered. A user, via a prompt 210, can enter the name of an access class, followed by the name of a node. Thereafter, code completion is provided that displays (in this case a list 220) of various methods that are possible for the combination of the access class and the particular node. In addition, a parameter list 230 of the selected method can also be concurrently displayed to provide further guidance for a user in determining which method to select.

Figure 3:
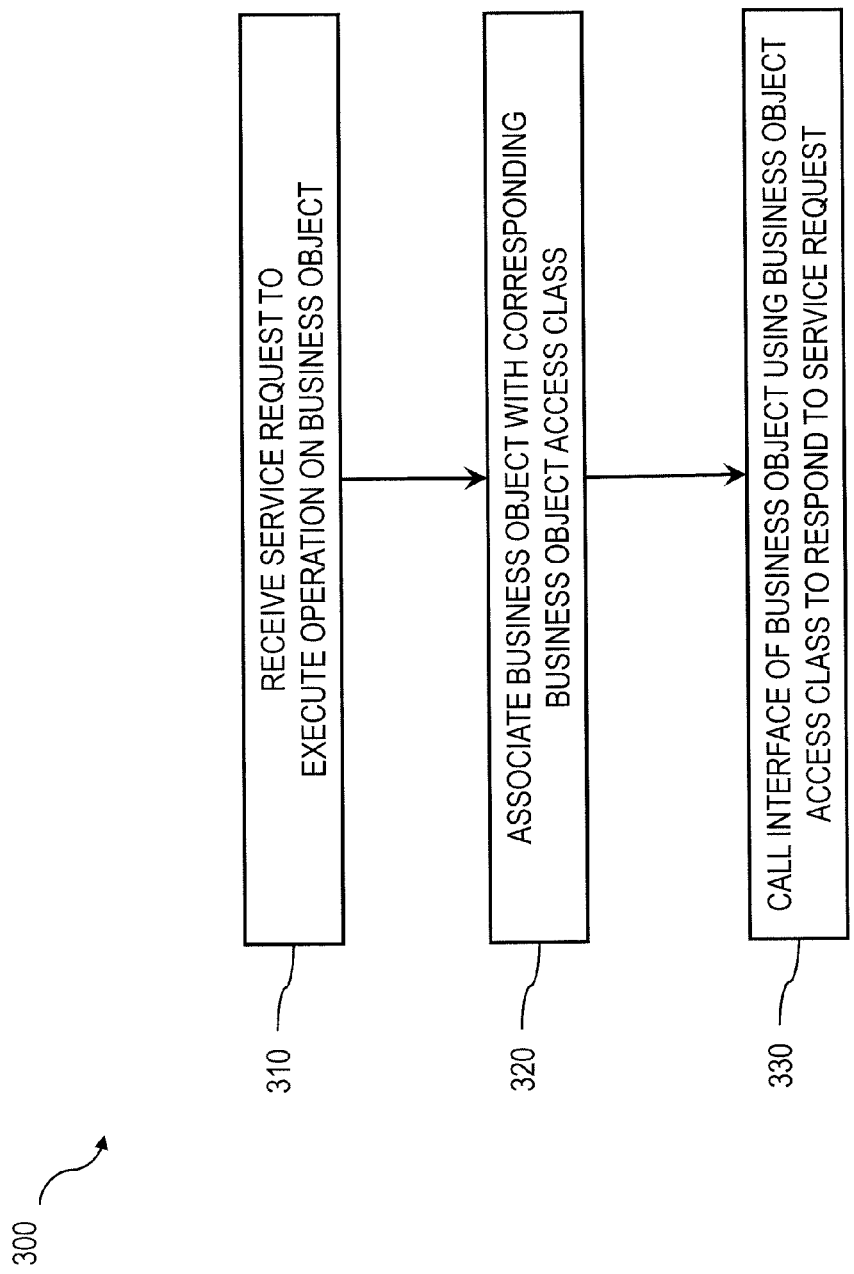
FIG. 3 is a process diagram illustrating a method of providing typed business object access, according to at least one implementation.

FIG. 3 is a process flow diagram 300 in which, at 310, a service request to execute an operation on a business object

| Action | | |
|---|---|---|
| " example for action CALCULATE | | |
| CLASS-METHODS calculate | | |
|   IMPORTING | | |
|     iv_node_id | TYPE sesf_node_id | "this one |
|     it_node_id | TYPE sesf_node_id_tab | "or this one (or none - |
| dependent from cardinality) | | |
|     is_action_parameter | TYPE ty_action_parameters-calculate | "if there are parameters |
|     is_reference_node | TYPE sesf_reference_node | "if the action is with |
| reference | | |
|   EXPORTING | | |
|     et_message | TYPE if_esf_types=>ty_messages. | | is received. This business object is associated, at 320, with one of a plurality of business object access classes that comprise methods, types, and constants to execute the operation on the business object. Thereafter, at 330, the business object is called using the associated business object access class to respond to the service request.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, functional programming language, logical programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and an interface such as a touch screen and/or a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method comprising:
receiving, by at least one data processor, a service request to execute an operation on a business object data structure from a plurality of business object data structures stored in a storage mechanism accessible by the at least one data processor, the business object data structure comprising a generic business object interface usable for accesses to the business object data structure originating externally to the business object data structure, the generic business object interface being usable for accessing any of the plurality of business object data structures;
associating, by the at least one data processor, the business object data structure with a respective one of a plurality of business object access classes, the associated business object access class being separate from the generic business object interface for accessing any of the plurality of business object data structures; and
calling, by the at least one data processor, the business object access class to respond to the service request, the calling of the business object access class resulting in further operations comprising:
generating all business object specific types required for a typed business object data structure directly into the associated business object access class;
calling the generic interface of the business object data structure by the associated business object access class using the generated business object specific types; and
executing the operation on the business object data structure using the business object specific types required for the typed business object data structure.

2. The method as in claim 1, further comprising automatically generating the associated business object access class during activation of the business object data structure.

3. The method as in claim 1, wherein the service request originates external to the business object data structure.

4. The method as in claim 3, wherein the service request originates from an application programming layer and is received by an enterprise services framework.

5. The method as in claim 1, wherein the service request originates internal to the business object data structure.

6. The method as in claim 1, wherein the operation is an access operation.

7. The method as in claim 1, wherein the business object data structure comprises a plurality of nodes, and wherein a global business object class applies to all of the plurality of nodes.

8. The method as in claim 7, wherein there is a local business object access class for each node, the local business object access class being used to execute an operation for the corresponding node.

9. The method as in claim 8, wherein the global business object access class specifies each of the local business object access classes for the business object data structure.

10. A non-transitory computer program product storing computer-executable instructions, which when executed by at least one data processor of at least one computing system, results in the at least one computing system performing operations comprising:
- receiving, by the at least one data processor, a service request to execute an operation on a business object data structure from a plurality of business object data structures stored in a storage mechanism accessible by the at least one data processor, the business object data structure comprising a generic business object interface usable for accesses to the business object data structure originating externally to the business object data structure, the generic business object interface being usable for accessing any of the plurality of business object data structures;
- associating, by the at least one data processor, the business object data structure with a respective one of a plurality of business object access classes, the associated business object access class being separate from the generic business object interface for accessing any of the plurality of business object data structures; and
- calling, by the at least one data processor, the business object access class to respond to the service request, the calling of the business object access class resulting in further operations comprising:
  - generating all business object specific types required for a typed business object data structure directly into the associated business object access class;
  - calling the generic interface of the business object data structure by the associated business object access class using the generated business object specific types; and
  - executing the operation on the business object data structure using the business object specific types required for the typed business object data structure.

11. The computer program product as in claim 10, wherein the business object access class is generated automatically during activation of the business object data structure.

12. The computer program product as in claim 10, wherein the service request originates external to the business object data structure.

13. The computer program product as in claim 12, wherein the service request originates from an application programming layer and is received by an enterprise services framework.

14. The computer program product as in claim 10, wherein the service request originates internal to the business object data structure.

15. The computer program product as in claim 10, wherein the operation is an access operation.

16. The computer program product as in claim 10, wherein the business object data structure comprises a plurality of nodes, and wherein a global business object class applies to all of the plurality of nodes.

17. The computer program product as in claim 16, wherein there is a local business object access class for each node, the local business object access class being used to execute an operation for the corresponding node, and wherein the global business object access class specifies each of the local business object classes for the business object.

18. A computer system comprising:
- at least one data processor; and
- memory storing computer-executable instructions, which when executed by the at least one data processor, results in perform operations comprising:
- receiving, by the at least one data processor, a service request to execute an operation on a business object data structure from a plurality of business object data structures stored in a storage mechanism accessible by the at least one data processor, the business object data structure comprising a generic business object interface usable for accesses to the business object data structure originating externally to the business object data structure, the generic business object interface being usable for accessing any of the plurality of business object data structures;
- associating, by the at least one data processor, the business object data structure with a respective one of a plurality of business object access classes, the associated business object access class being separate from the generic business object interface for accessing any of the plurality of business object data structures; and
- calling, by the at least one data processor, the business object access class to respond to the service request, the calling of the business object access class resulting in further operations comprising:
  - generating all business object specific types required for a typed business object data structure directly into the associated business object access class; and
  - calling the generic interface of the business object data structure by the associated business object access class using the generated business object specific types; and
  - executing the operation on the business object data structure using the business object specific types required for the typed business object data structure.

* * * * *